United States Patent
Chung et al.

(10) Patent No.: US 7,242,514 B2
(45) Date of Patent: Jul. 10, 2007

(54) ELECTROPHORETIC DISPLAY WITH THERMAL CONTROL

(75) Inventors: Jerry Chung, Mountain View, CA (US); Rong-Chang Liang, Cupertino, CA (US)

(73) Assignee: SiPix Imaging, Inc., Fremont, CA (US)

( * ) Notice: Subject to any disclaimer, the term of this patent is extended or adjusted under 35 U.S.C. 154(b) by 0 days.

(21) Appl. No.: 11/414,635

(22) Filed: Apr. 27, 2006

(65) Prior Publication Data

US 2006/0262384 A1    Nov. 23, 2006

Related U.S. Application Data

(62) Division of application No. 10/956,367, filed on Oct. 1, 2004, now Pat. No. 7,061,662.

(60) Provisional application No. 60/509,401, filed on Oct. 7, 2003.

(51) Int. Cl.
*G02B 26/00* (2006.01)

(52) U.S. Cl. .................. 359/296; 359/297; 359/290

(58) Field of Classification Search ................ 359/296, 359/240, 243, 290; 204/478, 485; 345/107
See application file for complete search history.

(56) References Cited

U.S. PATENT DOCUMENTS

| | | | |
|---|---|---|---|
| 3,612,758 A | 10/1971 | Evans et al. | |
| 5,930,026 A | 7/1999 | Jacobson et al. | |
| 5,961,804 A | 10/1999 | Jacobson et al. | |
| 6,525,865 B2 * | 2/2003 | Katase | 359/296 |
| 6,672,921 B1 | 1/2004 | Liang et al. | |
| 6,693,620 B1 * | 2/2004 | Herb et al. | 345/107 |
| 6,795,138 B2 | 9/2004 | Liang et al. | |
| 6,930,818 B1 | 8/2005 | Liang et al. | |
| 6,933,098 B2 | 8/2005 | Chan-Park et al. | |
| 2003/0161567 A1 * | 8/2003 | Baxter et al. | 385/11 |
| 2004/0131959 A1 | 7/2004 | Hou et al. | |
| 2004/0246562 A1 | 12/2004 | Chung et al. | |

OTHER PUBLICATIONS

Allen, K. (Oct. 2003). Electrophoretics Fulfilled. *Emerging Displays Review: Emerging Display Technologies*, Monthly Report—Oct. 2003, 9-14.

(Continued)

*Primary Examiner*—Timothy Thompson
(74) *Attorney, Agent, or Firm*—Howrey LLP

(57) ABSTRACT

An electrophoretic display (EPD) with thermal control is disclosed for controlling and maintaining an image in extreme temperature environments. Techniques are also disclosed for maintaining the EPD cell threshold voltage for EPD cells comprising an EPD display media at or above a desired level in an environment in which the EPD may be subjected to an extreme temperature. The techniques comprise sensing a sensed temperature associated with the EPD display media, determining whether the sensed temperature satisfies a criterion established to ensure that the display media temperature remains at a level associated with an acceptable EPD cell threshold voltage, and in the event it is determined that the sensed temperature does not satisfy the criterion, controlling the EPD display media temperature as required to bring the sensed temperature to a level that satisfies the criterion.

8 Claims, 13 Drawing Sheets

OTHER PUBLICATIONS

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, 19.6.1.

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003), The New Applications and the Dynamics of Companies. *TRI.* 1-10. (In Chinese, English abstract attached, full translation availabe upon request).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Ho, Candice. (Feb. 1, 2005) *Microcupt® Electronic Paper Device and Applicaiton*. Presentation conducted at USDC 4th Annual Flexible Display Conference 2005.

Ho, C.,& Liang, R.C. (Dec. 2003). *Microcupt (R) Electronic Paper by Roll-to-Roll Manufacturing Processes*. Presentation conducted at FEG, Nei-Li, Taiwan.

Hopper & Novotny, IEEE Trans. Electr. Dev., vol. ED-26, No. 8, 1148-1152 (1979).

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C. (Feb. 2005) *Flexible and Roll-able Displays/Electronic Paper—A Brief Technology Overview*. Flexible Display Forum, 2005, Taiwan.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M. & Chung, J. (Feb. 2003) *Passive Matrix Microcup(R) Electrophoretic Displays*. Paper presented at the IDMC, Taipei, Taiwan.

Liang, R.C., Hou, J., Zang, H.M. Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) <<Format Flexible Microcup (R) Electronic Paper by Roll-to-Roll Manufacturing Process >>, Presentation conducted at the 14th FPD Manufacturing Technology EXPO & Conference.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Nikkei Microdevices, (Dec. 2002) Newly-Developed Color Electronic Paper Promises—Unbeatable Production Efficiency. *Nikkei Microdevices*, 3. (in Japanese, with English translation).

Wang, X., Kiluk, S., Chang, C., & Liang, R.C. (Feb. 2004). Microcup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M.Hou, Jack, (Feb. 2005) *Flexible Microcup® EPD by RTR Process*. Presentation conducted at 2nd Annual Paper-Like Displays Conference, Feb. 9-11, 2005, St. Pete Beach, Florida.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging*, *SPIE* vol. 5289, 102-108.

Zang, H.M., & Liang, R.C. (2003) Microcup Electronic Paper by Roll-to-Roll Manufacturing Processes. *The Spectrum*, 16(2), 16-21.

* cited by examiner

Waveform A: 20V DC

Waveform B: Square wave with 20V DC

Non-Selecting row: 10V DC

Selecting row: 30V DC

Square wave AC signal

ELECTROPHORETIC DISPLAY WITH THERMAL CONTROL

This application is a divisional application of U.S. application Ser. No. 10/956,367 filed on Oct. 1, 2004 now U.S. Pat. No. 7,061,662; which claims the benefit of U.S. Provisional Application No. 60/509,401 filed Oct. 7, 2003; the whole contents of both applications are incorporated herein by reference.

RELATED APPLICATIONS

Both U.S. Provisional Patent Application No. 60/505,340 entitled "Passive Matrix Electrophoretic Display Driving Scheme" filed May 16, 2003 and co-pending U.S. Non-provisional patent application Ser. No. 10/837,239 6 entitled "Passive Matrix Electrophoretic Display Driving Scheme" filed Apr. 4, 2004 are incorporated herein by reference in their entirety.

FIELD OF INVENTION

The present invention relates generally to display devices. More specifically, an electrophoretic display with thermal control is disclosed.

BACKGROUND OF THE INVENTION

The electrophoretic display (EPD) is a non-emissive device based on the electrophoresis phenomenon of charged pigment particles suspended in a solvent. The EPD was first proposed in 1969. The display usually comprises two plates with electrodes placed opposing each other, separated by spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

There are several different types of EPDs. In the partition type EPD (see M. A. Hopper and V. Novotny, IEEE Trans. Electr. Dev., Vol. ED 26, No. 8, pp. 1148–1152 (1979)), there are partitions between the two electrodes for dividing the space into smaller cells in order to prevent undesired movements of particles such as sedimentation. The microcapsule type EPD (as described in U.S. Pat. No. 5,961,804 and U.S. Pat. No. 5,930,026) has a substantially two dimensional arrangement of microcapsules each having therein an electrophoretic composition of a dielectric fluid and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

An improved EPD technology was disclosed in co-pending applications, U.S. Pat. No. 09/518,488, filed on Mar. 3, 2000, U.S. Pat. No. 09/759,212, filed on Jan. 11, 2001, U.S. Pat. No. 09/606,654, filed on Jun. 28, 2000 and U.S. Pat. No. 09/784,972, filed on Feb. 15, 2001, all of which are incorporated herein by reference. The EPD comprises closed cells formed from microcups of well-defined shape, size and aspect ratio and filled with charged pigment particles dispersed in a dielectric solvent.

FIG. 1 illustrates a typical EPD cell 100 comprising a quantity of electrophoretic dispersion 102, the dispersion comprising a plurality of charged pigment particles 104 dispersed in a colored dielectric solvent 106. The dispersion 102 is contained by a top layer of insulating material 108 and a bottom layer of insulating material 110. In one embodiment, the insulating material may comprise a non-conductive polymer. In the cells described in the above-incorporated co-pending patent applications, the insulating layer may comprise a sealing and/or adhesive layer, or the microcup structure. The dispersion and associated insulating materials are positioned between an upper electrode 112 and a lower electrode 114.

An EPD may be driven by a passive matrix system. For a typical passive matrix system, there are column electrodes on the top side (viewing surface) of the display and row electrodes on the bottom side of the cells (or vice versa). The row electrodes and the column electrodes are perpendicular to each other.

Cross bias is a well-known problem for a passive matrix display. The voltage applied to a column electrode not only provides the driving bias for the cell on the scanning row, but it also affects the bias across the non-scanning cells on the same column. This undesired bias may force the particles of a non-scanning cell to migrate to the opposite electrode. This undesired particle migration causes visible optical density change and reduces the contrast ratio of the display.

Conventional EPD devices, such as those described in U.S. patent application Ser. No. 60/417,762 filed Oct. 10, 2002, which is incorporated herein by reference, are sensitive to environments where temperature ranges may be extreme such as an outdoor environment. When an EPD is used in an outdoor environment, it may experience temperature extremes rising to more than 80° C. or less than −20° C. When the environmental temperature exceeds 60° C. or falls below 0° C., the performance of a conventional EPD can degrade quickly. Although conventional EPDs may work well in controlled, moderate indoor environments, the outdoor temperature extremes can affect the threshold effect exhibited by EPD cells such as those described in the '762 application.

Heating devices are used in display systems to control temperatures in extreme environments. A heating device for a flat panel display should be thin, compact, and light in weight. Typically micro-wire and thin film heating devices have been used for flat panel displays. Micro-wire heaters exhibit satisfactory transparency and can be applied to the viewing side of a display. However, the costs for micro-wire heaters are generally high. The costs for thin film heaters are also high and such heaters often filter desired light from the display, thus degrading displayed images.

Thus, there is a need for an EPD that can adjust for environmental temperature extremes such as those found in an outdoor setting. There is also a need for an EPD that under extreme temperature conditions can maintain satisfactory EPD performance.

BRIEF DESCRIPTION OF THE DRAWINGS

Various embodiments of the invention are disclosed in the following detailed description and the accompanying drawings.

DETAILED DESCRIPTION OF THE INVENTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

The term "threshold voltage" (Vth), in the context of the present disclosure, is defined as the maximum bias voltage that does not cause the particles in a cell to move between electrodes. The term "driving voltage" (Vd), in the context of the present disclosure, is defined as the bias voltage applied to change the color state of a cell, such as by driving the particles in the cell from an initial position at or near one electrode to an end position at or near the opposite electrode. The driving voltage Vd used in a particular application must be sufficient to cause the color state of the cell to change within the required performance parameters of the application, including as measured by such parameters as the time it takes for the state transition to be completed.

A "scanning" row in a passive matrix display is a row in the display that is currently being updated or refreshed. A "non-scanning" row is a row that is not currently being updated or refreshed. A "positive bias", in the context of the present disclosure, is defined as a bias that tends to cause positively charged particles to migrate downwards (i.e., upper electrode at higher potential than lower electrode). A "negative bias", in the context of the present disclosure, is defined as a bias that tends to cause positively charged particles to migrate upwards (i.e. ,ower electrode at higher potential than upper electrode).

Figure 1:
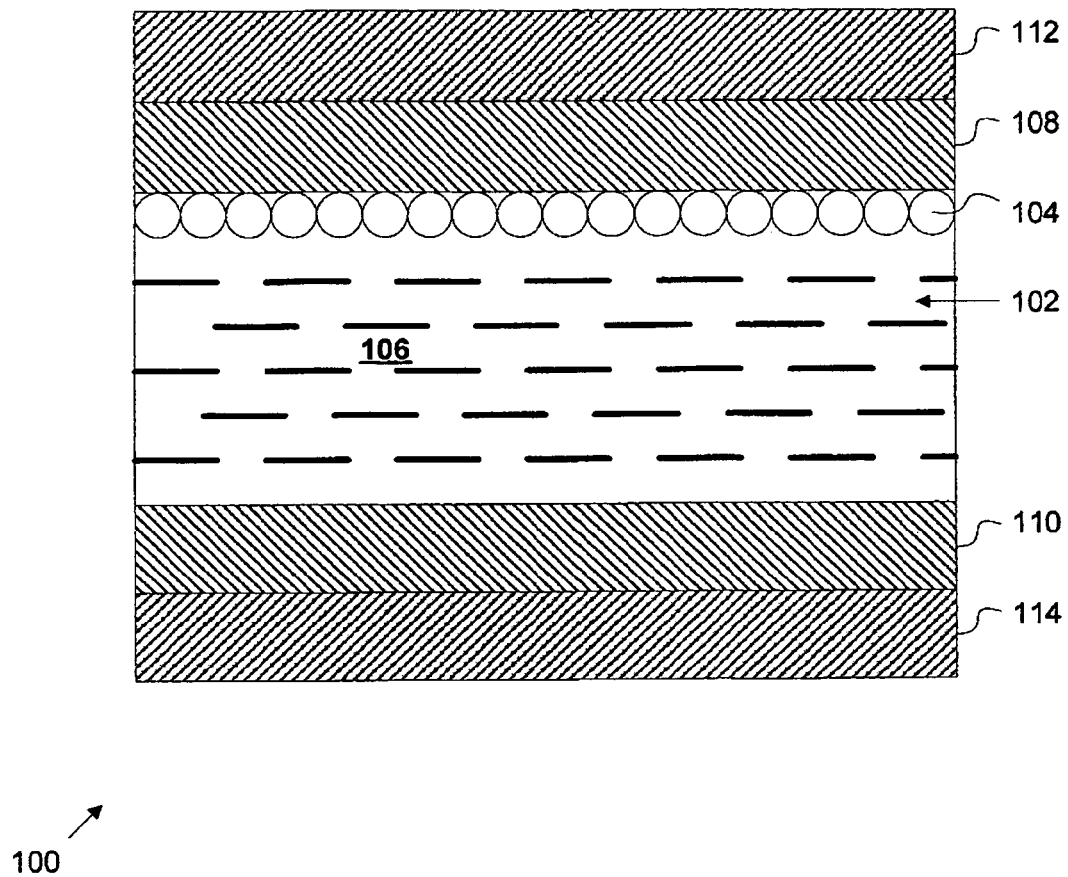
FIG. 1 illustrates a typical EPD cell.
Figure 2:
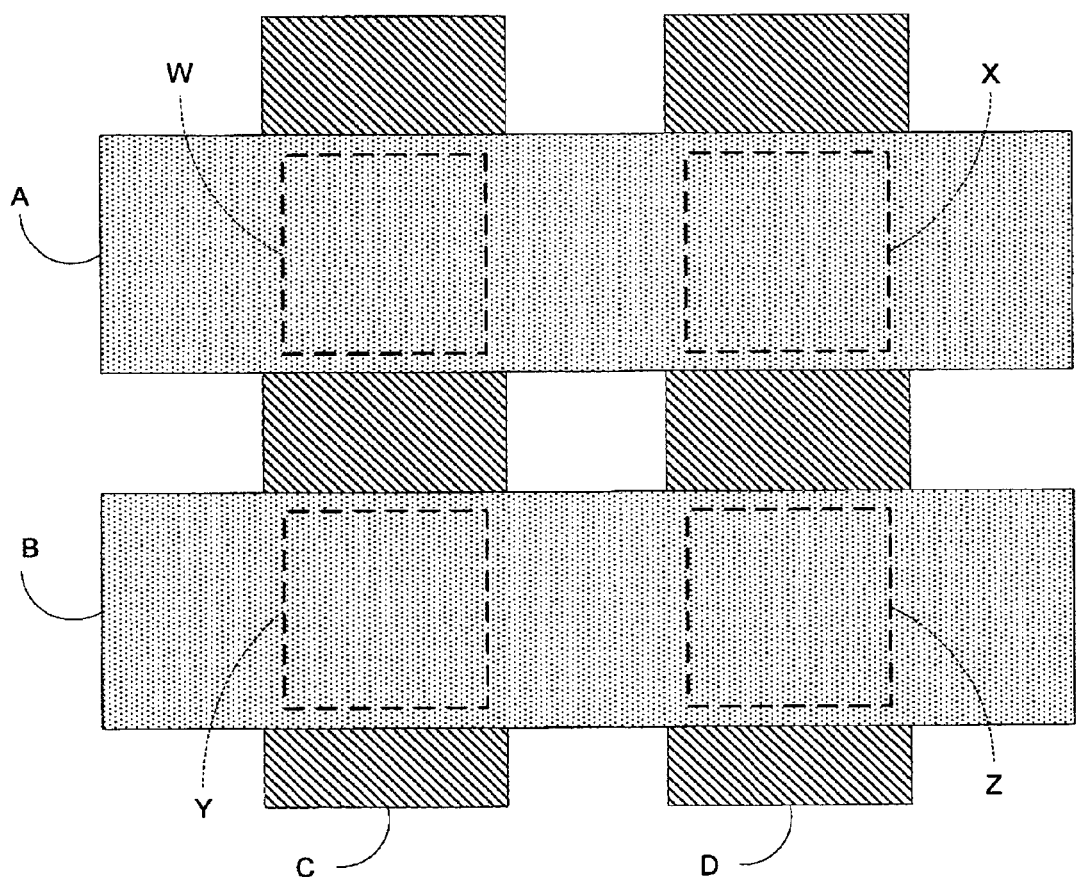
FIG. 2 illustrates a top view of a 2×2 passive matrix.
Figure 3A:
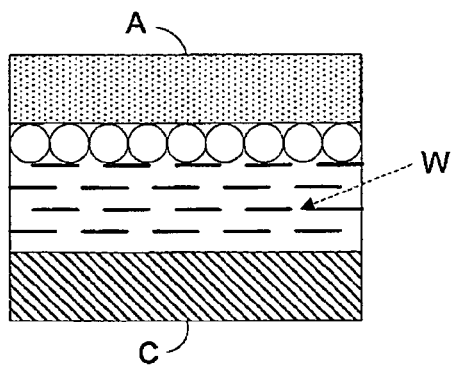
FIGS. 3A–3D illustrates a lateral view of a 2×2 passive matrix.
Figure 3B:
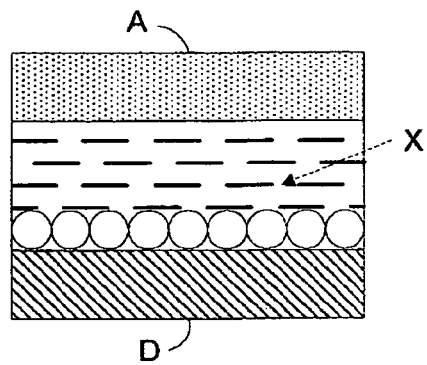
Figure 3C:
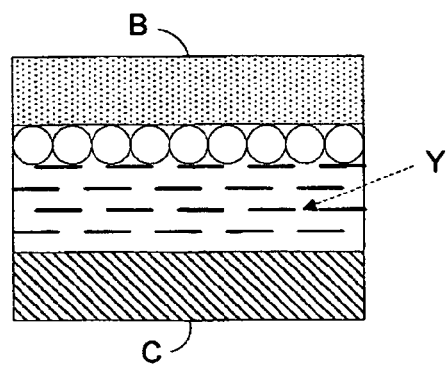
Figure 3D:
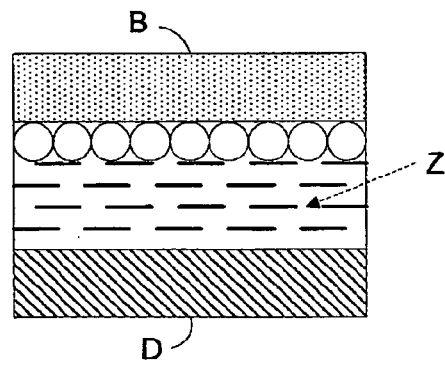

For a typical passive-matrix, the row electrodes are on the top, and the column electrodes are on the bottom and perpendicular to the row electrodes. FIG. 2 and FIGS. 3A–3D illustrate a 2×2 passive matrix. FIG. 2 shows the top view of a general 2×2 passive matrix. In this figure, voltage A drives the top, non-scanning row and voltage B drives the bottom, scanning row.

Initially, as shown in FIGS. 3A–3D, the particles in cells W, Y and Z are at the top of the cells, and the particles in cell X are at the bottom of the cell. Assume the scanning row B is to be modified such that the particles in cell Y are moved to the bottom electrode while the particles in cell Z are to be maintained at their current position at the top electrode. The particles in the cells of the non-scanning row should, of course, remain at their initial positions—W at the top electrode and X at the bottom electrode—even if a cross-biasing condition is present.

Because Cells W and X are in a non-scanning row, the goal is to ensure that the particles remain at the current electrode position even when there is a cross bias condition affecting the row. The threshold voltage of the cell is an important factor in these two cases. Unless the threshold voltage is equal to or greater than the cross bias voltage that may be present, the particles in these cells will move when such a cross bias is present, thereby reducing the contrast ratio.

In order to drive the particles in cell Y from the top electrode to the bottom electrode within a specific time period, a driving voltage Vd must be applied. The driving voltage used in a particular application may be determined by a number of factors, including but not necessarily limited to cell geometry, cell design, array design and layout, and the materials and solvents used. In order to move the particles in cell Y without affecting the particles in cells W, X and Z, the driving voltage Vd applied to change the state of cell Y must also be of a magnitude, and applied in such a way, so as not to result in the remaining cells being cross biased in an amount greater than the threshold voltage Vth of the cells.

To determine the minimum threshold voltage needed to avoid unintended state changes in the basic passive matrix illustrated in FIGS. 2 and 3A–3D under these conditions, the following inequality conditions should be satisfied:

A–C≦Vth
D–A≦Vth
B–C≧Vd
B–D≦Vth

This system of equations may be solved by summing the three inequalities involving Vth, to yield the inequality (A–C)+(D–A)+(B–D)≦Vth+Vth+Vth, which simplifies to B–C≦3 Vth, or 3 Vth≧B–C. Combining this inequality with the remaining inequality B–C≧Vd, we conclude that 3 Vth≧B–C≧Vd, which yields 3 Vth≧Vd or Vth≧⅓ Vd. That is, for the passive matrix illustrated in FIGS. 2 and 3A–3D, the cells must have a threshold voltage equal to or greater than one third of the driving voltage to be applied to change the state of those cells in which a state change is desired in order to avoid changing as a result of cross bias the state of those cells in which a state change is not desired. Referring further to FIGS. 2 through 3A–3D, if the driving voltage Vd is applied to the scanning row B, then solution of the above inequalities indicates that to ensure that the driving bias voltage is applied to cells to be programmed and that no more than the threshold voltage is applied to other cells (i.e., non-programming cells in the scanning row and all cells in the non-scanning row) the voltage applied to the non-scanning row A should be equal to ⅓ Vd, the voltage applied to the column electrode associated with a cell in the scanning row to be programmed (i.e., display state changed), such as column electrode C, should be 0 volts, and the voltage applied to the column electrode associated with a cell in the scanning row that is not to be programmed (i.e., retain the initial or reset state) should be equal to ⅔ Vd. For example, in one embodiment the driving voltage required to achieve acceptable performance is 30 V. If the driving voltage Vd=30 V in the passive matrix display illustrated in FIGS. 2 and 3A–3D, then the minimum threshold voltage that would be required to retain the initial state of cells W, X, and Z while changing the state of cell Y by applying a driving voltage of 30 V to cell Y would be Vth=10 V. Assuming B=30 V, the solution to the above equations is A=10 V, C=0 V and D=20 V. By reference to FIGS. 2 and 3A–3D, one can see that under these conditions the bias applied to each of cells W, X, and Z would in fact be less than or equal to the minimum threshold voltage Vth=10 V. For proper operation and performance, therefore, the cell threshold voltage must be quite high relative to the driving voltage to be applied to change the electrophoretic display cell state to avoid unwanted state changes or display performance degradation due to cross bias.

As demonstrated above, the EPD cells must have a threshold voltage greater than or equal to ⅓ of the driving voltage applied to change the cell display state in order for a passive matrix EPD to function properly. By material selection and structural design, a 5 V to 50 V threshold effect can be achieved. Assuming the EPD can operate at an environmental temperature up to 80° C. and the driving voltage is 30 V, the EPD cell material and structural design can be selected such that the cells exhibit a threshold voltage of 10 V at 80° C.

Figure 4:
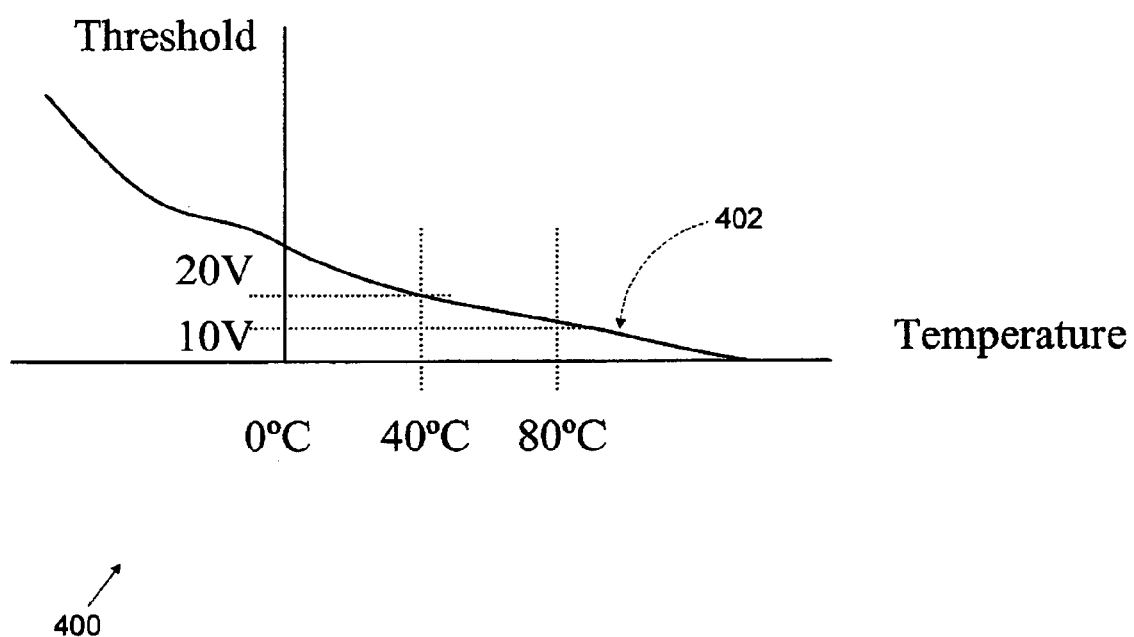
FIG. 4 is a graph illustrating the relationship between threshold voltage and temperature, in accordance with an embodiment of the present invention.

However, as noted above, the threshold voltage also varies with temperature. In general, threshold voltage is low at high temperature and threshold voltage is high at low temperature. FIG. 4 illustrates the inverse relationship between cell threshold voltage and temperature.

Controlling EPD cell temperature to maintain the cell threshold voltage within a desired range, regardless of the ambient temperature, is disclosed. In one embodiment, a temperature control system is configured to maintain the cell temperature in a range that results in the threshold voltage being maintained at a value between ⅓ to ⅔ of the driving voltage. Using the example illustrated in FIG. 4, in one embodiment a heating pad and associated thermal control are provided to maintain the cell temperature between 40° C. and 80° C., resulting in the cell threshold voltage being maintained in the range of 10 V to 20 V (i.e., ⅓ to ⅔ of the 30 V driving voltage in the illustrative example described above). In one embodiment, the EPD cell temperature is maintained at or near a fixed temperature, e.g., 50° C.+/−5° C. The temperatures and voltages described above are presented for sake of example only, and the temperatures and voltages may be different depending on such factors as the cell structure, materials used, and the relationship between temperature and threshold voltage for a particular EPD cell.

Figure 5A:
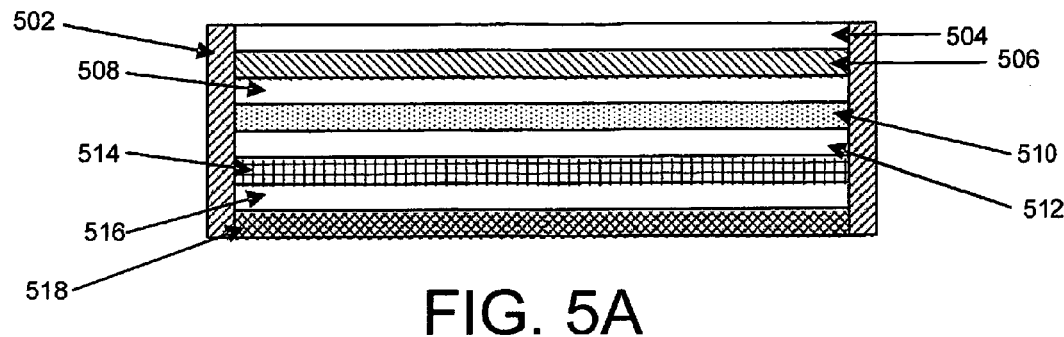
FIG. 5A illustrates an EPD module structure with a heating pad in accordance with an embodiment of the present invention.

FIG. 5A illustrates an EPD module structure with a heating pad used in one embodiment. The EPD module structure includes frame 502, clear front plate 504, EPD panel 506, front air gap 508, metal plate 510, heating pad 512, thermal barrier sheet 514, rear air gap 516, and solar cell panel 518. Although shown in this embodiment, metal plate 510, solar cell panel 518, and thermal barrier sheet 514 may be excluded in other embodiments.

Clear front plate 504 may be implemented using polycarbonate, plexi-glass, or another transparent thermal barrier material. In one embodiment, EPD panel 506 is laminated to clear front plate 504. Heating pad 512, which may be composed of an individual or multiple pads, can be placed behind EPD panel 506 between front air gap 508 and heating pad 512. Metal plate 510 can be laminated to the front of heating pad 512 to evenly distribute heat. Thermal barrier sheet 514, which may or may not be present in other embodiments, can be laminated to the rear side of heating pad 512 or the rear side of solar cell panel 518. Solar cell panel 518 provides electric power for heating pad 512 and the control and driver circuit, as described below in connection with FIG. 11. In other embodiments, sources of electric power other than a solar cell panel may be used. Thermal barrier sheet 514 can be used to prevent heat loss from the rear side of the EPD module structure as well as thermal insulation against an external (e.g., outdoors) environment. Rear air gap 516 between solar cell panel 518 and heating pad 512 can be included to provide additional protection as an extra thermal barrier.

In one embodiment in which an EPD temperature above 10° C. is to be maintained in an environment in which the temperature is −30° C., the EPD module structure is constructed using the following materials and dimensions:

Clear front plate: 0.25" polycarbonate sheet
Frame: G10 fiberglass
Front air gap: 0.1"
Metal plate: 0.125" aluminum
Heating pad: Floor heating roll, 10 W/ft$^2$
Thermal barrier: none
Rear air gap: 0.2"

Figure 5B:
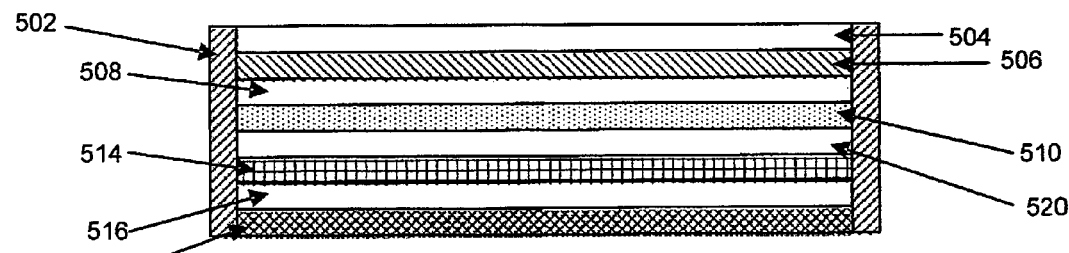
FIG. 5B illustrates an EPD module structure with a cooling pad in accordance with an embodiment of the present invention.

FIG. 5B illustrates an EPD module structure with a cooling pad used in one embodiment. Again, the EPD module structure includes frame 502, clear front plate 504, EPD panel 506, front air gap 508, metal plate 510, thermal barrier sheet 514, rear air gap 516, and solar cell panel 518. However, instead of heating pad 512 (FIG. 5A), a cooling pad 520 is provided. Also, metal plate 510 and thermal barrier sheet 514 may be excluded in other embodiments.

Constructed similarly to the EPD module structure in FIG. 5A, the EPD module structure includes cooling pad 520, which can be implemented as an individual pad or multiple pads or segments. Implementation of cooling pad 520 can be provided using typical cooling elements such as refrigerants or other coolants in both gas and liquid forms. Cooling pad 520 can be placed behind EPD panel 506. Front air gap 508 can be included between EPD panel 506 and cooling pad 520. Optional metal plate 510 may be laminated to the front of cooling pad 520 in order to evenly absorb heat. Optionally, thermal barrier sheet 514 laminated to the rear side of cooling pad 520 or the rear side of solar cell panel 518. Solar cell panel 518 provides electric power for cooling pad 520 and the control and driver circuit, as described below in connection with FIG. 11. In other embodiments, sources of electric power other than a solar cell panel may be used. Optional thermal barrier sheet 514, if included, prevents heat transfer from the rear side of the EPD module structure as well as thermal insulation against an external (e.g., outdoors) environment. Rear air gap 516 may be placed between solar cell panel 518 and cooling pad 520 to provide protection as an extra thermal barrier.

Figure 5C:
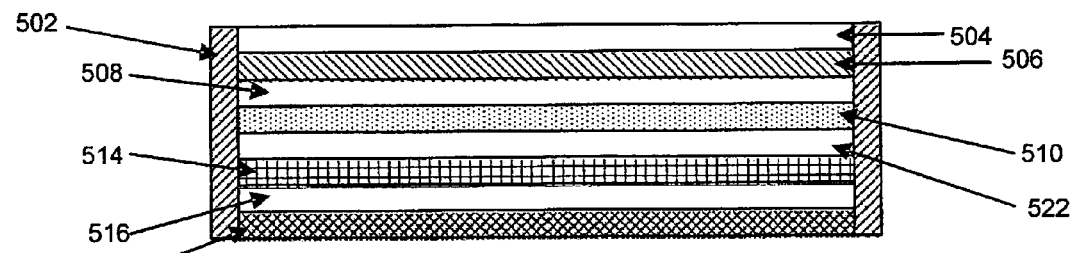
FIG. 5C illustrates an EPD module structure with a thermal control pad in accordance with an embodiment of the present invention.

FIG. 5C illustrates an EPD module structure used in one embodiment with a thermal control pad for heating and cooling. As with FIGS. 5A and 5B, an EPD module structure is provided, including frame 502, clear front plate 504, EPD panel 506, front air gap 508, optional metal plate 510, optional thermal barrier sheet 514, rear air gap 516, and solar cell panel 518. However, instead of heating pad 512, a thermal control pad 522 is provided.

Thermal control pad 522 provides temperature control and maintenance for the EPD module structure. Implemented as either an individual pad or multiple segments/pads, thermal control pad 522 can provide heating and cooling of EPD module structure, as needed. In one embodiment, the thermal control pad 522 is used to raise or lower the temperature of the EPD panel 506 to maintain the EPD cell threshold voltage at a desired value or within a desired range of values.

Figure 6A:
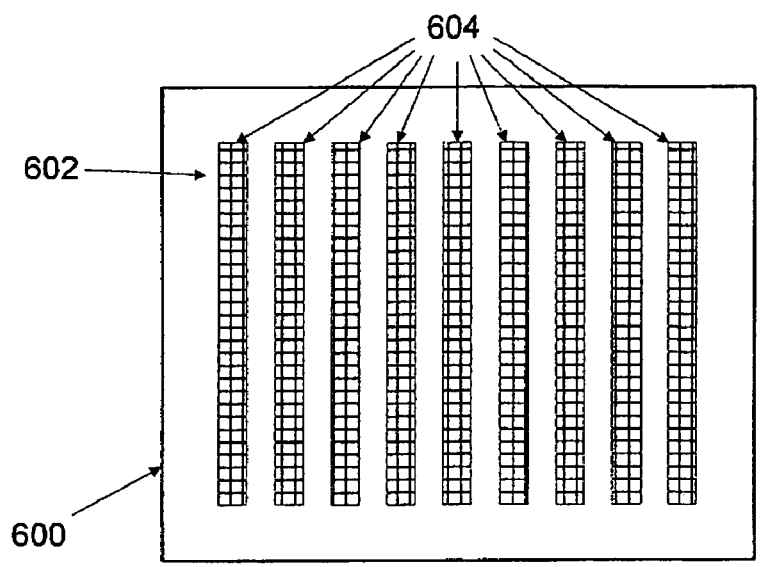
FIG. 6A illustrates a thermal control pad in accordance with an embodiment of the present invention.

FIG. 6A illustrates a thermal control pad used in one embodiment. In this embodiment, thermal control pad 600 comprises both heating and cooling elements. In this example, a striped configuration is created by integrating column shaped heating pad segments 604 into a cooling pad 602. In one embodiment, the heating pad segments 604 are placed on top of cooling pad 602. In other embodiments, the individual heating pad segments 604 may be placed under or within cooling pad 602. Other arrangements can also be implemented.

Figure 6B:
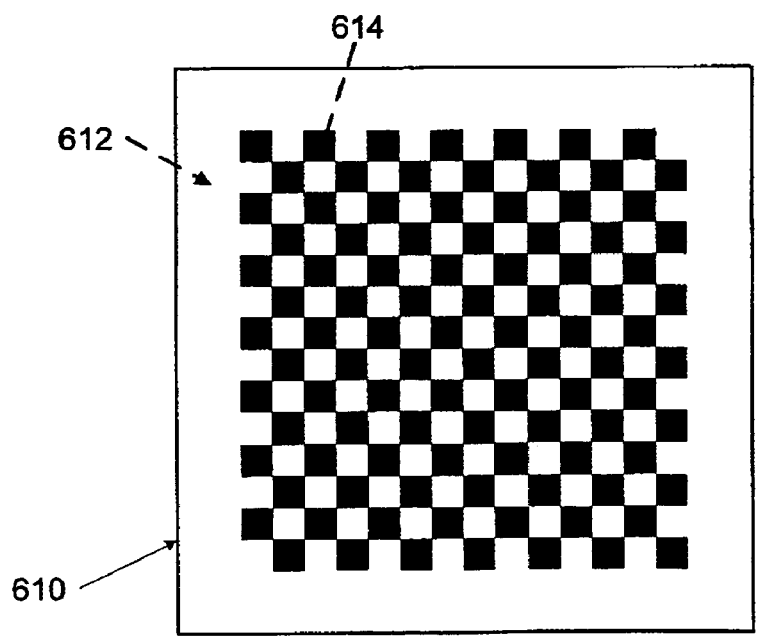
FIG. 6B illustrates a thermal control pad in accordance with an alternative embodiment of the present invention.

FIG. 6B illustrates a thermal control pad used in one embodiment. In this embodiment, thermal control pad 610 is implemented in a "checkerboard" pattern. In one embodiment, cooling pad 612 is interwoven with individual heating pads 614. In other embodiments, a single heating pad can be interwoven with individual cooling pads. In still other embodiments multiple individual heating pads can be interwove with multiple individual cooling pads. Other embodiments of thermal control pad 610 may be implemented using a variety of patterns of cooling and heating pads and is not limited to only those embodiments listed herein.

In one embodiment, the heating required to maintain the threshold voltage of the EPD cells at the desired level or within the desired range is provided at least in part by applying to an electrode of the EPD an AC signal that generates the required heat without interfering with the operation of the EPD. In one embodiment, using this approach eliminates the need to include in the EPD a separate heating pad, such as the heating pad 512 of FIG. 5A. A typical EPD is driven by applying a DC voltage to generate an electric field to cause the charged pigment particles to migrate to a desired position. In a typical EPD, the particles on average do not move very fast, and may have a response time on the order of 5 ms to 500 ms. As a result, when a fast switching AC signal is applied, for example a square waveform at 10 kHz (100 μs cycle), the particles cannot react to the fast switching waveform and as a result react only to the DC voltage of the waveform. In one embodiment, this characteristic is used to generate heat by using an electrode of the display as a heating element. Heat is generated by applying to the electrode a fast switching AC signal selected so as to generate the required heat as a product of the AC current passing through the electrode while not interfering with the operation of the display by selecting a driving signal that has a DC voltage equal to the DC voltage required to be applied to the electrode under the applicable EPD driving scheme.

Figure 7A:
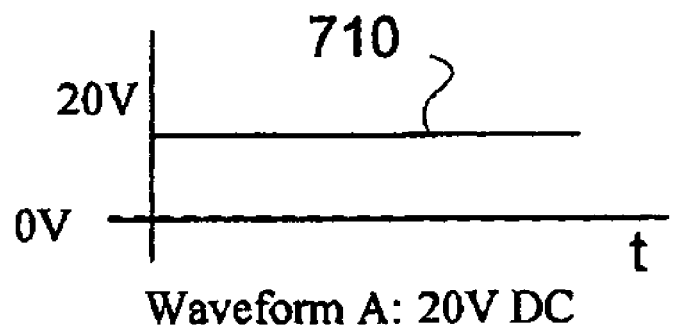
FIG. 7A illustrates a DC voltage 710 applied to an electrode of an EPD in one embodiment.

FIG. 7A illustrates a DC voltage 710 applied to an electrode of an EPD in one embodiment. In this example, a DC voltage of 20 V is applied to the electrode, such as may be required under the driving scheme of the EPD. In one embodiment, the electrode may be a thin film electrode.

Figure 7B:
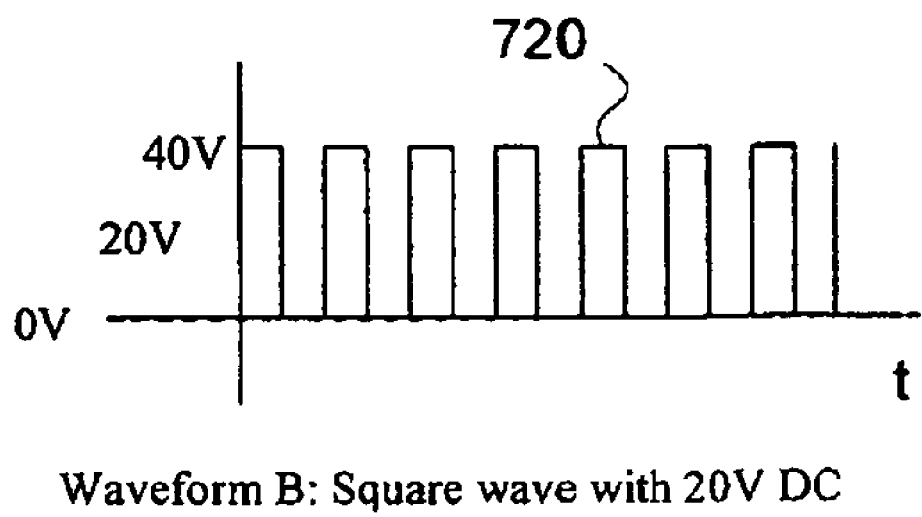
FIG. 7B illustrates an AC signal 720 applied to an electrode layer in one embodiment to achieve the same effect on the EPD cells as the DC voltage of FIG. 7A while also generating heat as a product of the AC current passing through the electrode.

FIG. 7B illustrates a driving signal 720 applied to an electrode layer in one embodiment to achieve the same effect on the EPD cells as the DC voltage of FIG. 7A while also generating heat as a product of the AC current passing through the electrode. In this example, a square wave at 10 KHz (100 μs cycle) has the same effect on the EPD cells as the DC voltage shown in FIG. 7A.

Figure 8A:
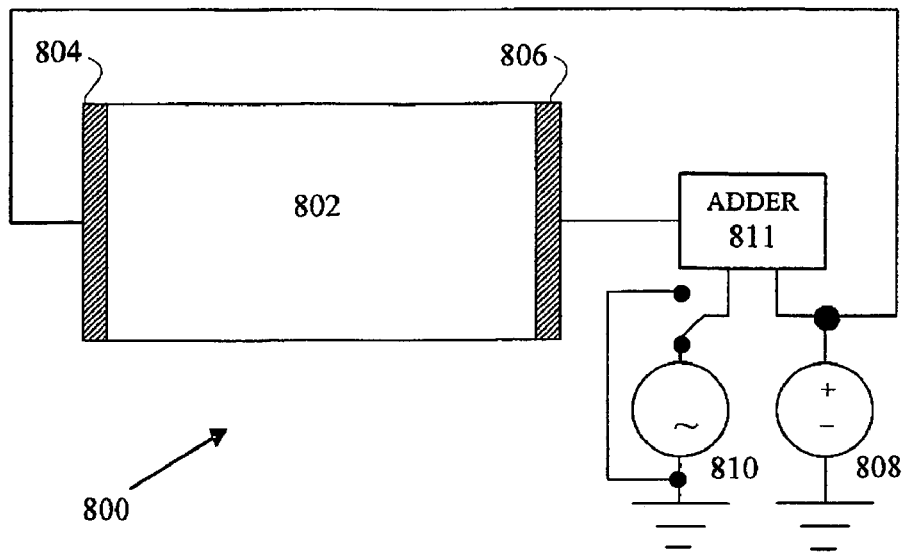
FIG. 8A illustrates an EPD thin film heater in accordance with an embodiment.

FIG. 8A illustrates an EPD thin film heater in accordance with an embodiment. The thin film heater 800 comprises a common electrode 802. In one embodiment, the common electrode 802 comprises a common electrode on the viewing side of a segment display. In one embodiment, the common electrode 802 comprises a common electrode on the viewing side of an active matrix display. The thin film heater 800 comprises a first contact pad 804 connected electrically to one end of the common electrode 802 and a second contact pad 806 connected electrically to the opposite end of common electrode 802. In one embodiment, DC voltage source 808 is configured to apply a DC voltage to common electrode 802 by supplying DC voltage to the first contact pad 804 and one input of adder circuit 811. The DC voltage supplied by DC voltage source 808 is a DC voltage applied to the common electrode 802 under the driving scheme used by an EPD in which the thin film heater 800 is used. The thin film heater 800 also comprises an AC voltage source 810 configured to supply an AC signal to another input of adder 811 when heating is desired. When heating is desired, the switch associated with AC voltage source 810 is in the position shown in FIG. 8A, i.e., the AC signal supplied by source 810 is provided as an input to the adder 811. If heating is not desired, the switch associated with source 810 is switched to open the connection between the source 810 and the adder 811 and instead connect the AC input line to adder 811 to ground, as can be seen from FIG. 8A. When the switch associated with AC source 810 is aligned to provide the AC signal supplied by source 810 as input to adder 811, i.e., when heating is desired, adder 811 adds the DC signal from DC voltage source 808 and the AC signal from 810 together and applies the combined signal to the second contact pad 806. Driver and control circuits not shown in FIG. 8A control the operation of DC voltage source 808 to apply the DC voltage required for driving and the operation of AC voltage source 810 and its associated switch, when needed, to provide heating as required for proper operation of the EPD.

Figure 8B:
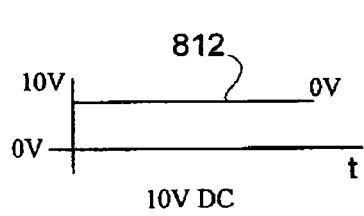
FIG. 8B illustrates an AC voltage applied to a common electrode of an exemplary EPD thin film heater.

In one embodiment, the thin film heater 800 of FIG. 8A is used in an EPD in which the driving scheme requires that 10 V DC be applied to the common electrode for driving. FIG. 8B illustrates a DC voltage supplied by DC voltage source 808 for driving in one such embodiment. The DC voltage 812 may be applied to common electrode 802 alone for driving when heating is not required. However, as described below, DC voltage 812 may also be applied while applying an AC voltage to generate heat for thermal control, as described above.

Figure 8C:
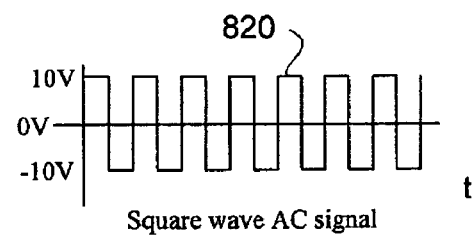
FIG. 8C illustrates an AC voltage applied to an EPD thin film heater.

FIG. 8C illustrates an AC voltage applied to an EPD thin film heater in one embodiment. In this example, AC voltage 820 may be applied to common electrode 802 to enable thin film heater 800 to produce heat. In one embodiment, the frequency of the AC signal 820 is such that the EPD cells of the display comprising the EPD thin film heater do not react quickly enough to be affected materially by the AC signal. As a result, the cells do not change state (or remain in substantially the same state) when the AC signal is applied for heating at a time when no DC voltage is being applied to the common electrode for driving. Likewise, when the AC signal is applied to generate heat during driving the stable state of the cells is determined by the DC driving voltage applied to the common electrode and the voltages applied to other electrodes associated with the cells (e.g., pixel or segment electrodes), and not by the AC signal being applied for heating.

Figure 9A:
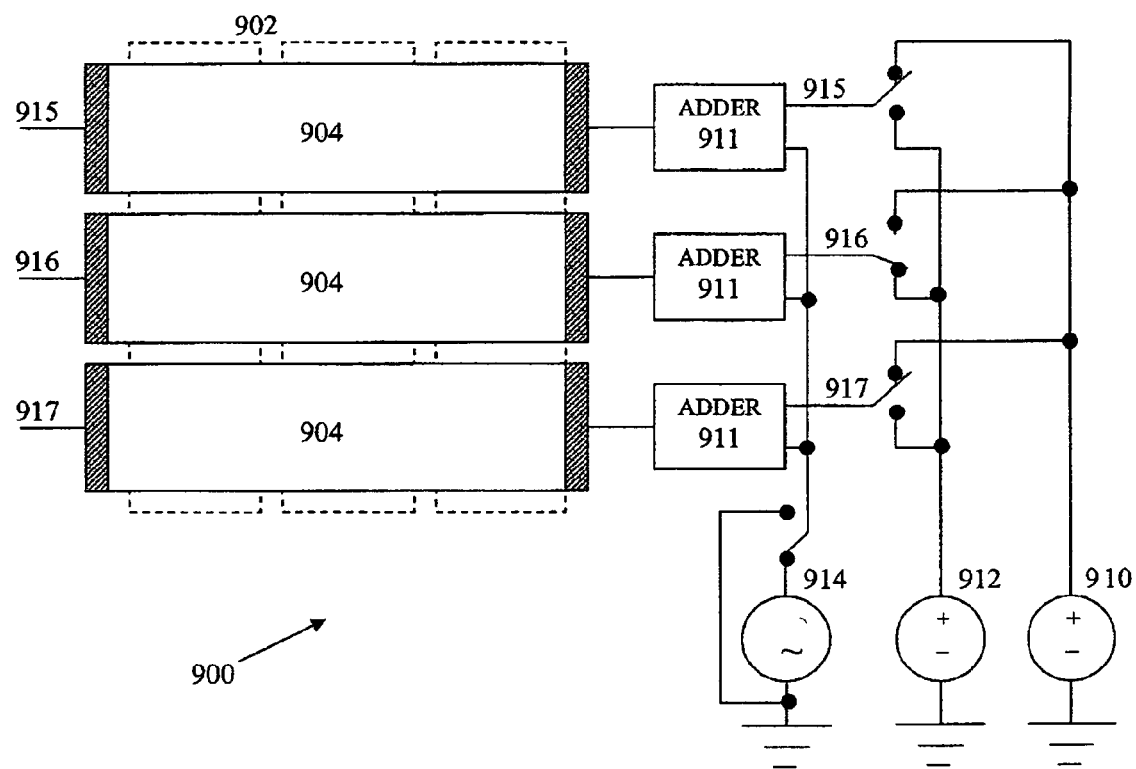
FIG. 9A illustrates a passive matrix EPD 900 used in one embodiment.

FIG. 9A illustrates a passive matrix EPD electrode and heater configuration 900 used in one embodiment. In the example shown, the passive matrix EPD electrode and heater configuration 900 comprises a plurality of column electrodes 902 in a first electrode layer positioned on a first side of the EPD cell layer (not shown) and a plurality of row electrodes 904 in a second electrode layer positioned on a second side of the EPD cell layer opposite the first side. In one embodiment, the column electrodes 902 comprise transparent conductive material, such as ITO or other transparent conductive material, and are located on the viewing side of the display. Row electrodes 904 may use thin film conductive material that generates heat when current passes through the electrode. Each of row electrodes 904 has a pair of contact pads 915-917 at either end for making electrical contact. In one alternative embodiment, each row electrode may have a contact pad on only one side of the electrode. Each of row electrodes 904 is configured to enable application of one or the other of two DC voltages used in the driving scheme. In the example shown in FIG. 9A, the DC voltages are supplied by DC voltage source 910 and DC voltage source 912. A voltage signal is provided to a contact pad at one end of each row electrode via a switch associated with DC supply lines 915-917, respectively, and to a corresponding contact pad at the opposite end of the row electrode via a conductive trace (not shown). Each of the DC supply lines 915-917 may be connected via an associated switch with a selected one of the two DC voltage sources 910 and 912. This enables the DC voltage provided by DC voltage source 910 to be applied to the contact pads of the row electrode when the corresponding switch is aligned to DC voltage source 910. Alternatively, the DC voltage provided by DC voltage source 912 can be applied instead to the contact pads when the switches associated with DC supply lines 915-917 are aligned to DC voltage source 912. In this example, the DC voltage supplied by DC voltage source 910 is 10 V DC and the DC voltage supplied by DC voltage source 912 is 30 V DC.

In this example, the configuration 900 is used in a passive matrix EPD in which 10 V DC is applied to non-scanning rows during driving and 30 V DC is applied to the scanning row(s). Each of the row electrodes 904 also is configured to have applied to it, as desired, for heating an AC signal supplied by AC voltage source 914. If heating is not desired, then the switch associated with AC voltage source 914 is aligned to connect the AC supply lines to the adders 911 to ground (i.e., opposite the position as shown in FIG. 9A), thus preventing the supply of an AC voltage to adders 911 and, subsequently, row electrodes 904. For non-scanning rows of the passive matrix EPD comprising configuration 900, the 10 V DC voltage supplied by DC voltage source 910 is applied, and the AC signal supplied by AC voltage source 914 may also be applied via the adders 911 as desired to generate heat. For scanning rows, the 30 V DC voltage supplied by DC voltage source 912 is applied, and the AC signal supplied by AC voltage source 914 may also be applied through adder 911 as desired to generate heat. If heating is desired when the display is not being scanned, the AC signal supplied by AC voltage source 914 may be applied without also applying a DC voltage to the row electrodes 904. As in the embodiments described above in connection with FIG. 8A, the frequency of the AC signal supplied by AC voltage source 914 is selected such that it does not affect the state of the EPD cells materially and does not interfere materially with the driving of the EPD cells to desired stable states, which is determined instead by the DC voltages applied to the row and column electrodes during driving.

The frequency of the AC signal used for heating must be selected based on the characteristics of the EPD cells and associated structures. In one embodiment, the frequency is selected based on simulations performed in which the response of the EPD cells to the application of different AC waveforms is simulated and the AC waveform selected for heating is one to which the EPD cells did not react materially. In one alternative approach, a physical embodiment of the EPD cells and associated structures may be constructed and a variety of AC waveforms actually applied to the physical embodiment to observe the response of the EPD cells to the various AC waveforms.

In the example shown in FIG. 9A, the rows associated with the top and bottom row electrodes 904 are not being scanned and are therefore shown as being connected to non-scanning row DC voltage source 910. The row associated with center row electrode 904 is being scanned and is therefore shown, in this example, as being connected to scanning row DC voltage source 912. The AC voltage source 914 may be enabled to generate heating, if desired, or disabled when heating is not required.

Figure 9B:
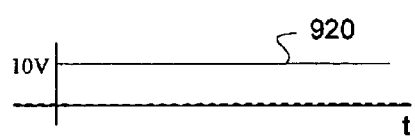
FIG. 9B illustrates a DC voltage 920 that can be applied to non-selected rows during scanning of EPD 900 in one embodiment.

FIG. 9B illustrates a 10 V DC voltage 920 supplied by non-scanning row DC voltage source 910 of FIG. 9A in one embodiment. In this example, 10 V DC is the DC voltage that must be applied to non-scanning rows of the passive matrix EPD in order to ensure that the cross bias applied to cells of the non-scanning rows is less than the threshold voltage.

Figure 9C:
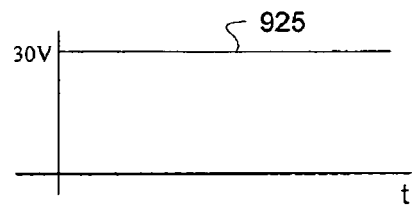
FIG. 9C illustrates a DC voltage 925 of 30 V DC applied to the scanning row of EPD 900.

FIG. 9C illustrates a 30 V DC voltage 925 supplied by scanning row DC voltage source 912 of FIG. 9A in one embodiment. In this example, 30 V DC is applied to the scanning row, such as the row associated with center row electrode 904 of FIG. 9A, for driving.

Figure 9D:
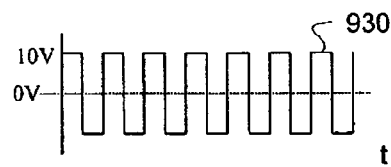
FIG. 9D illustrates an AC voltage 930 that can be applied to passive matrix EPD 900.

FIG. 9D illustrates an AC voltage 930 supplied by the AC voltage source 914 of FIG. 9A in one embodiment. AC voltage 930 varies between 10 V and −10 V and, as described above, switches between the two levels with a frequency selected such that the EPD cells do not have time to react materially to the AC signal 930.

For an EPD, (e.g., a passive matrix EPD) similar configurations to those described above can be applied. In other embodiments, different configurations can be implemented including variations to cell and electrode matrices, AC/DC voltages, contact pads, electrode materials as well as other aspects of the thin film heater.

Significant advantage can occur by using one or more electrodes of an EPD to generate heat, as described above. This eliminates additional costs for an outside heating device, or for incorporating additional materials and structures into the EPD to provide for heating, and improves optical performance of the display by reducing the obstructions to light emitting from an EPD.

While the thin film heaters of FIGS. 8A–9D are described in connection with an EPD, those of ordinary skill in the art will recognize that the techniques described herein may be applied as well to other types of device in which an AC signal may be applied to an existing electrode or other conductive structure to generate heat, as desired, without interfering materially with the normal operation of the device and in particular with the primary function of the structure used for heating.

Figure 10A:
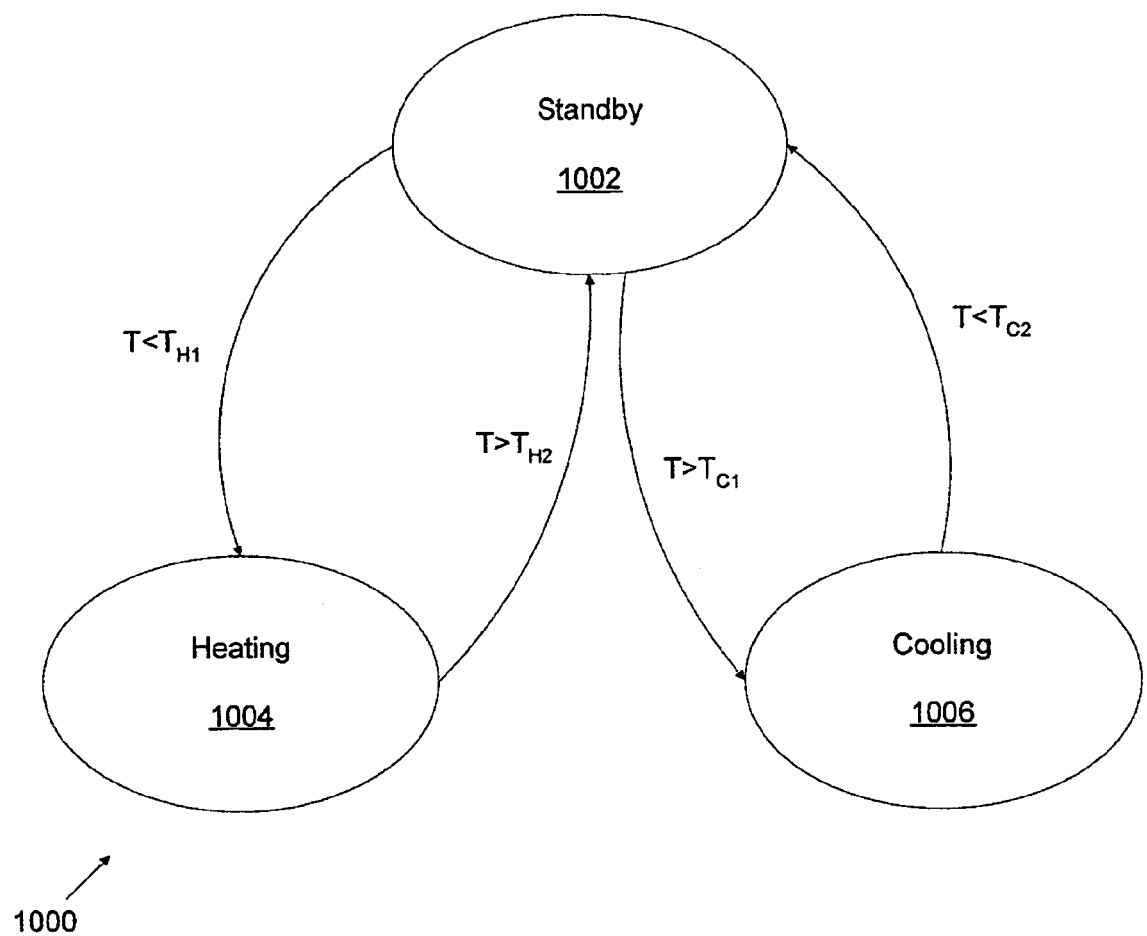
FIG. 10A is a state diagram illustrating a thermal control algorithm 1000 used in one embodiment.

FIG. 10A is a state diagram illustrating a thermal control algorithm 1000 used in one embodiment. In one embodiment, the algorithm shown in FIG. 10A is used in connection with a thermal control system comprising a thermal control pad capable of either heating or cooling the EPD, as needed, such as the thermal control pad 522 of FIG. 5C. The EPD thermal control system, if not heating or cooling, may be in a standby state 1002 in which heating and cooling pads are not actively heating or cooling the EPD. In one embodiment, the thermal control system is deactivated when in standby state 1002. In one embodiment, the thermal control system is not fully deactivated but instead is running in a standby mode when in standby state 1002.

If when the thermal control system is in the standby state 1002 the EPD display media temperature drops below a heat activation threshold temperature $T_{H1}$, the thermal control system transitions as illustrated in FIG. 10A to a "heating" state 1004 in which the heating functionality of the thermal control pad is activated to provide heating to the EPD display media. If, when the thermal control system is in the "heating" state 1004, the EPD display media temperature rises above a "deactivate heat" threshold temperature $T_{H2}$, the heating functionality of the thermal control pad is deactivated and the system returns to the standby state 1002. In one embodiment, the deactivate heat threshold temperature is different from the activate heat threshold temperature. In one embodiment, the activate threshold temperature $T_{H1}$ is less than the deactivate heat threshold temperature $T_{H2}$. In other embodiments, the activate threshold temperature, $T_{H1}$, may be the same as the deactivate heat threshold temperature, $T_{H2}$. If the system is in the standby state 1002 and the temperature rises above an "activate cooling" temperature $T_{C1}$, the thermal control system transitions to a "cooling" state 1006. In one embodiment, the cooling functionality of the thermal control pad is used to cool the EPD display media when the thermal control system is in cooling state 1006. If when the system is in cooling state 1006 the temperature drops below a "deactivate cooling" threshold temperature, $T_{C2}$, the system transitions to the standby state 1002 and the cooling functionality of the thermal control pad is deactivated. In one embodiment, the activate cooling threshold temperature, $T_{C1}$, may be different than the deactivate cooling threshold temperature, $T_{C2}$. In one embodiment, the activate cooling threshold, $T_{C1}$, is greater than the deactivate cooling threshold, $T_{C2}$. In one alternative embodiment, the activate cooling threshold temperature, $T_{C1}$, may be the same as the deactivate cooling threshold temperature, $T_{C2}$.

Figure 10B:
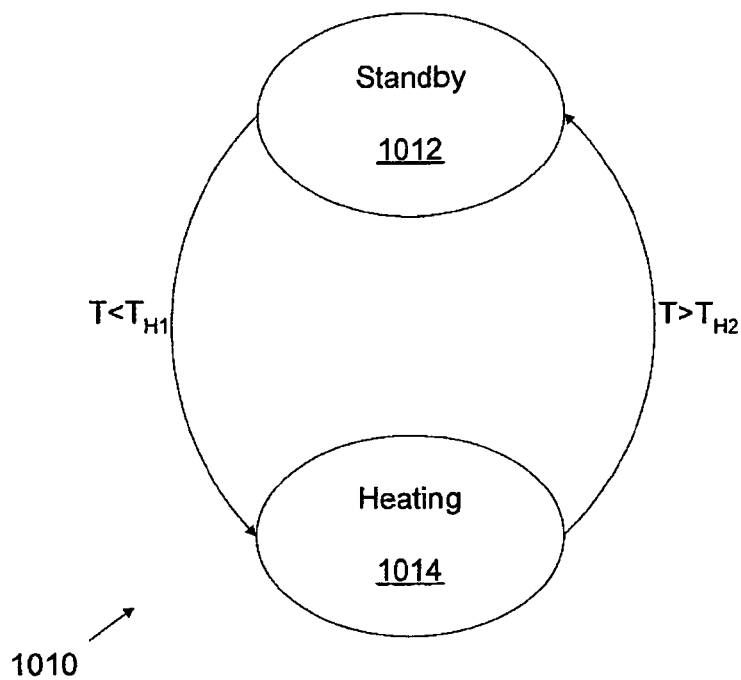
FIG. 10B is a state diagram illustrating a thermal control heating algorithm 1010 used in one embodiment.

FIG. 10B is a state diagram illustrating a thermal control algorithm 1010 used in one embodiment. In one embodiment, the algorithm 1010 is implemented to control a thermal control system that comprises a heating pad, such as the heating pad 512 of FIG. 5A. The EPD thermal control system, if not heating, may be in a standby state 1012 in which the heating pads is not actively heating the EPD. In one embodiment, the thermal control system is deactivated when in standby state 1012. In one embodiment, the thermal control system is not fully deactivated but instead is running in a standby mode when in standby state 1012.

If when the thermal control system is in the standby state 1012 the EPD display media temperature drops below a heat activation threshold temperature $T_{H1}$, the thermal control system transitions as illustrated in FIG. 10B to a "heating" state 1014 in which the heating pad is activated to provide heating to the EPD display media. If when the thermal control system is in the "heating" state 1014 the EPD display media temperature rises above a "deactivate heat" threshold temperature, $T_{H2}$, the heating pad is deactivated and the system returns to the standby state 1012. In one embodiment, the deactivate heat threshold temperature, $T_{H2}$, is different than the activate heat threshold temperature, $T_{H1}$. In one alternative embodiment, the deactivate heat threshold, $T_{H2}$ may be the same as the activate heat threshold temperature, $T_{H1}$.

Figure 10C:
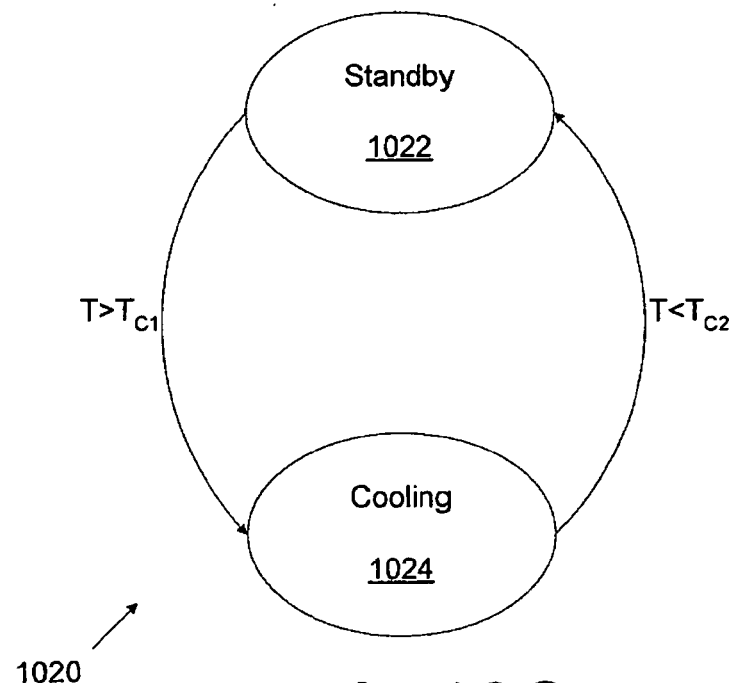
FIG. 10C is a state diagram 1020 illustrating a thermal control cooling algorithm 1020 used in one embodiment.

FIG. 10C is a state diagram 1020 illustrating a thermal control algorithm 1020 used in one embodiment. In one embodiment, the algorithm 1020 is implemented to control a thermal control system that comprises a cooling pad, such as cooling pad 520 of FIG. 5B. The EPD thermal control system, if not cooling, may be in a standby state 1022 in which the cooling pad is not actively cooling the EPD. In one embodiment, the thermal control system is deactivated when in standby state 1022. In one embodiment, the thermal control system is not fully deactivated but instead is running in a standby mode when in standby state 1022. If when the system is in the standby state 1022 the temperature rises above an "activate cooling" temperature $T_{C1}$, the thermal control system transitions to a "cooling" state 1024. In one embodiment, the cooling pad is used to cool the EPD display media when the thermal control system is in activate cooling state 1024. If when the system is in "cooling" state 1024 the temperature drops below a "deactivate cooling" threshold temperature, $T_{C2}$, the system transitions to the standby state 1022 and the cooling pad is deactivated. In one embodiment, the activate cooling threshold, $T_{C1}$, is greater than the deactivate cooling threshold, $T_{C2}$. In one embodiment, the "activate cooling" threshold temperature, $T_{C1}$, may be the same as the "deactivate cooling" threshold temperature, $T_{C2}$.

Figure 11:
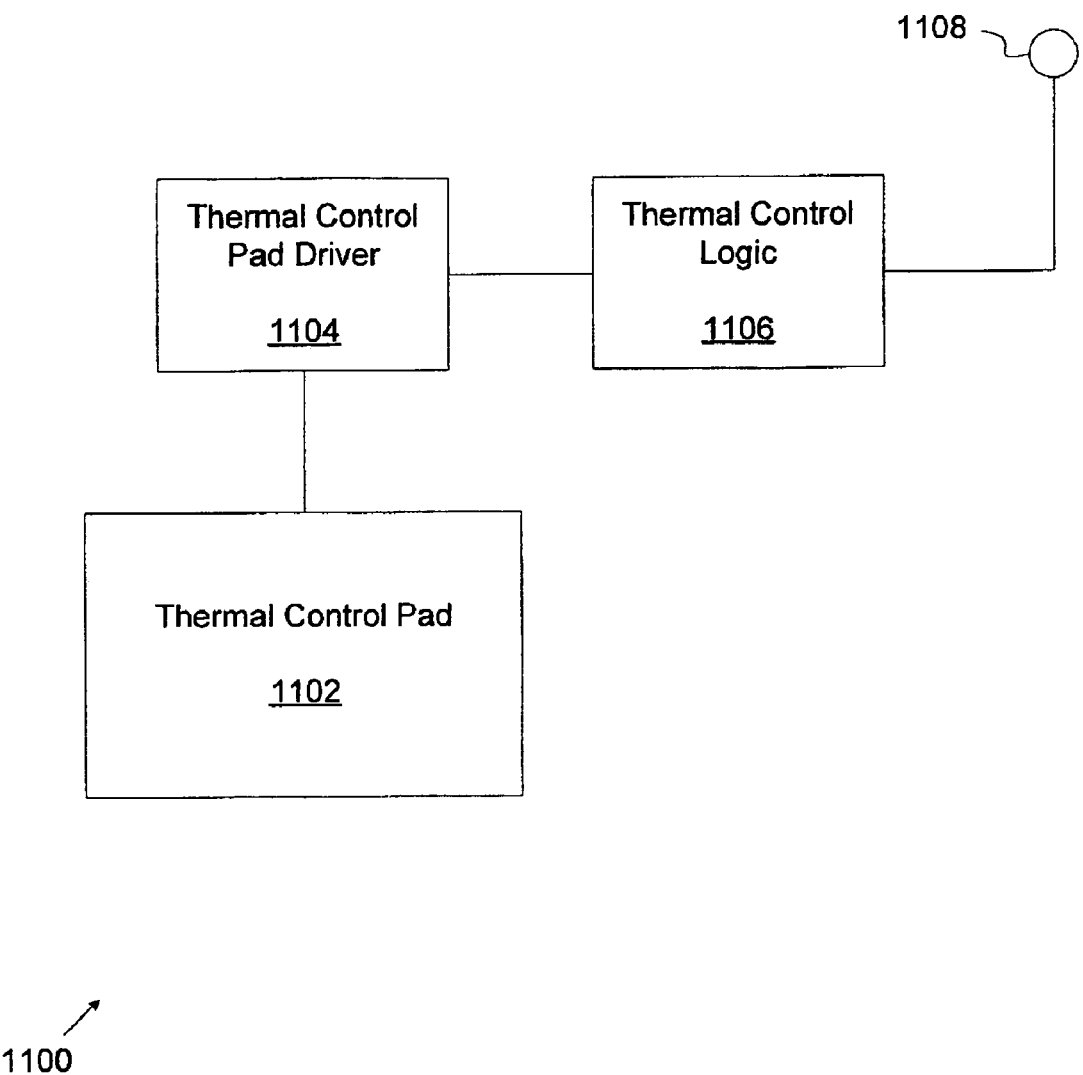
FIG. 11 illustrates an EPD thermal control system in accordance with an embodiment of the present invention.

FIG. 11 illustrates an EPD thermal control system 1100 used in one embodiment. Thermal control pad 1102 receives driving voltages from thermal control pad driver 1104. Overall control of thermal control system 1100 is provided by thermal control logic module 1106, which receives temperature signals from sensor 1108. In one embodiment, the sensor 1108 is configured to sense the ambient temperature and the thermal control logic 1106 controls the thermal control pad driver circuit as required to maintain the EPD display media temperature at the desired level based on the ambient temperature. In one embodiment, the sensor 1108 is configured to sense the temperature of the EPD display media. In one embodiment, the sensor 1108 comprises a temperature sensor positioned in or near the EPD cell media. In one embodiment, the sensor 1108 comprises a thermocouple embedded in the EPD display media. In one embodiment, the sensor 1108 may comprise multiple sensors configured to sense parameters other than environmental and/or display media temperature, such as humidity or other environmental conditions.

In one embodiment, the logic implemented on thermal control logic 1106 comprises one of the algorithms illustrated in FIG. 10A, 10B, or 10C, depending on the type of thermal control pad included in the EPD (i.e., heating/cooling, heating, or cooling).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generating heat for thermal control, comprising:
   an electrode having a primary function requiring that a prescribed DC voltage be applied to the electrode;
   a first voltage source configured to supply the prescribed DC voltage to the electrode; and
   a second voltage source configured to supply to the electrode a signal comprising an AC component and a DC component that is the same as the prescribed DC voltage at the same time the prescribed DC voltage is being applied, the signal comprising the AC component and the DC component being selected so as to generate heat as a result of current flow through the electrode and so as not to interfere with the primary function of the electrode.

2. The system of claim 1, wherein the AC component switches at a selected rate and amplitude.

3. A method for thermal control in an EPD comprising:
   applying a prescribed DC voltage to an electrode in the EPD to produce a first effect; and
   simultaneously applying a signal comprising an AC component and a DC component that is the same as the prescribed DC voltage to the electrode in the EPD to produce a second effect.

4. The method of claim 3, wherein the prescribed DC voltage is applied to the electrode to cause charged pigment particles to migrate to a desired position.

5. The method of claim 3, wherein the signal comprising the AC component and the DC component is applied to the electrode to generate heat while not interfering with the operation of the EPD.

6. The method of claim 3, wherein the electrode comprises a common electrode.

7. The method of claim 3, wherein the electrode comprises a row electrode.

8. The method of claim 3, wherein the electrode comprises a column electrode.

* * * * *